May 25, 1943. J. P. SEAHOLM 2,320,015
DISK HARROW
Filed May 31, 1940 3 Sheets-Sheet 1
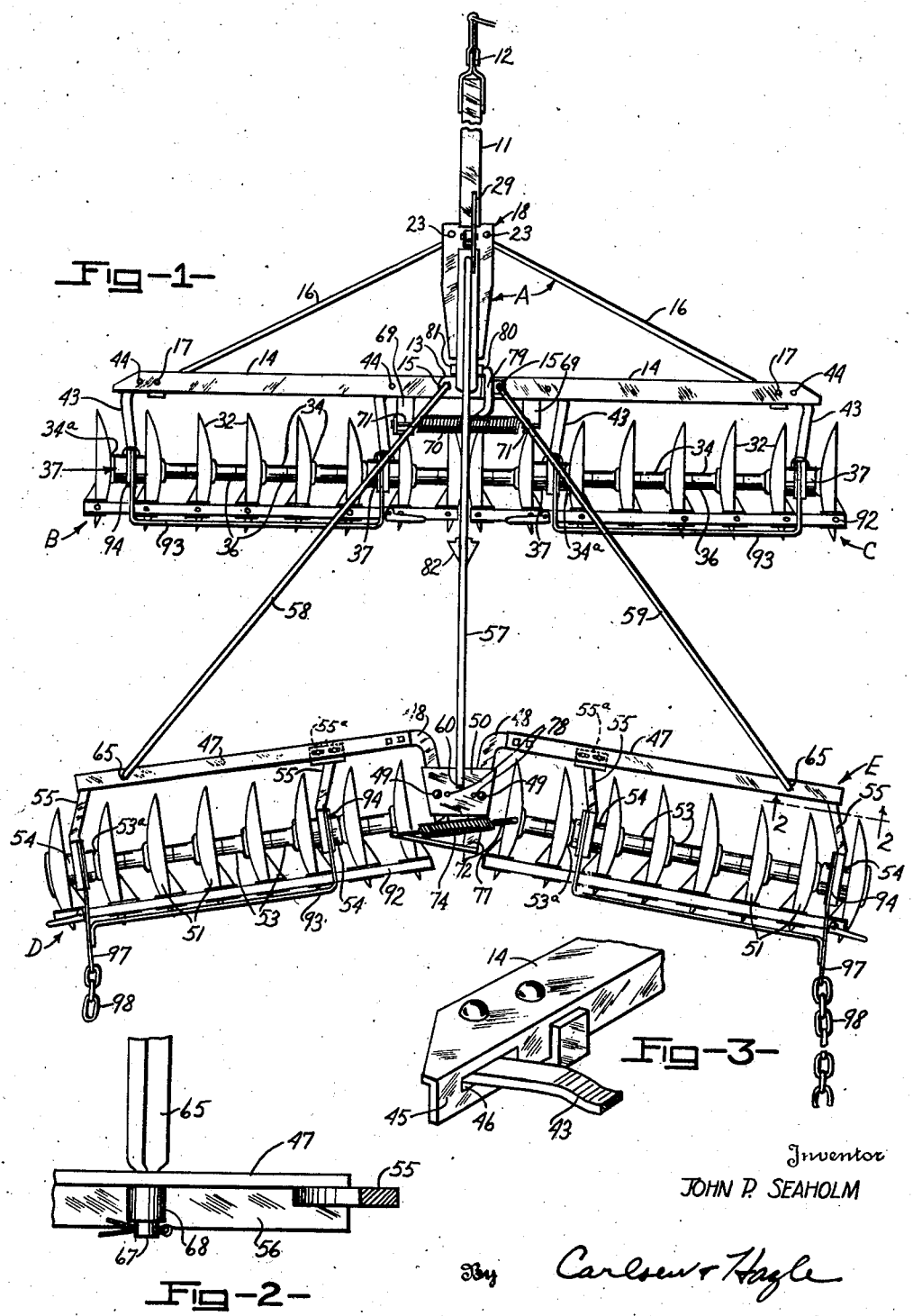
Inventor
JOHN P. SEAHOLM
By Carlsen & Hagle
Attorneys

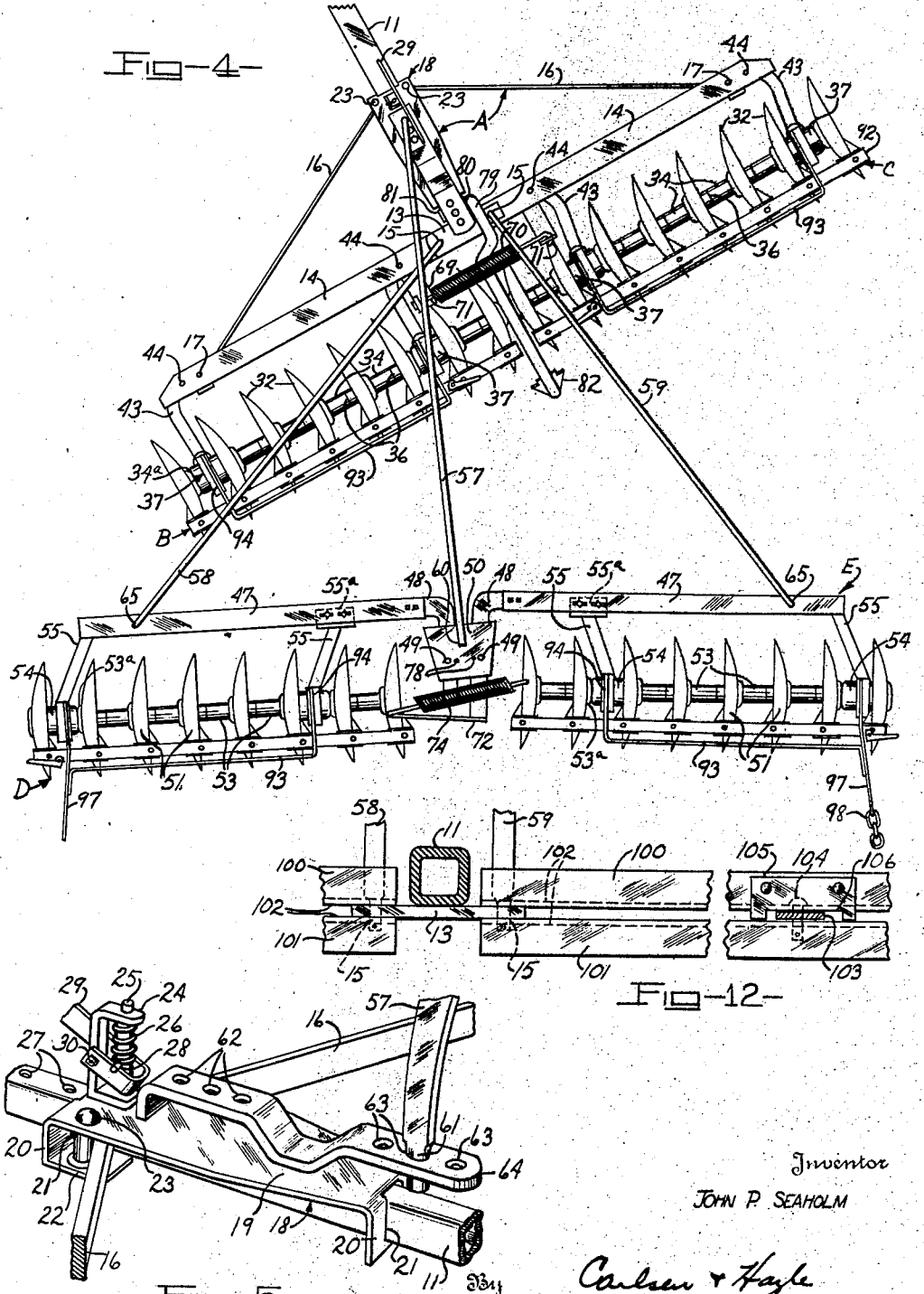

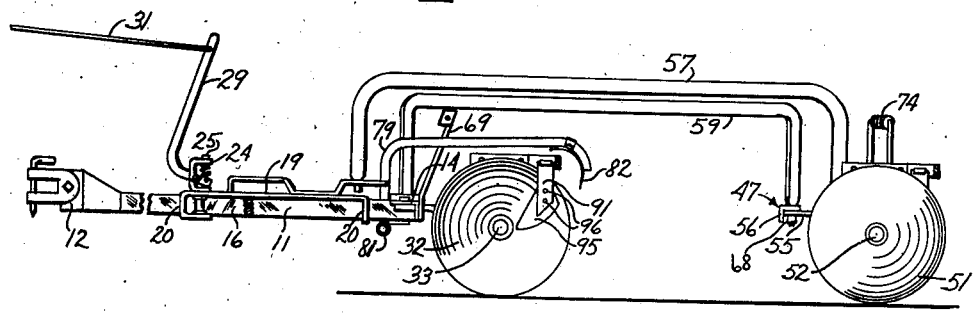
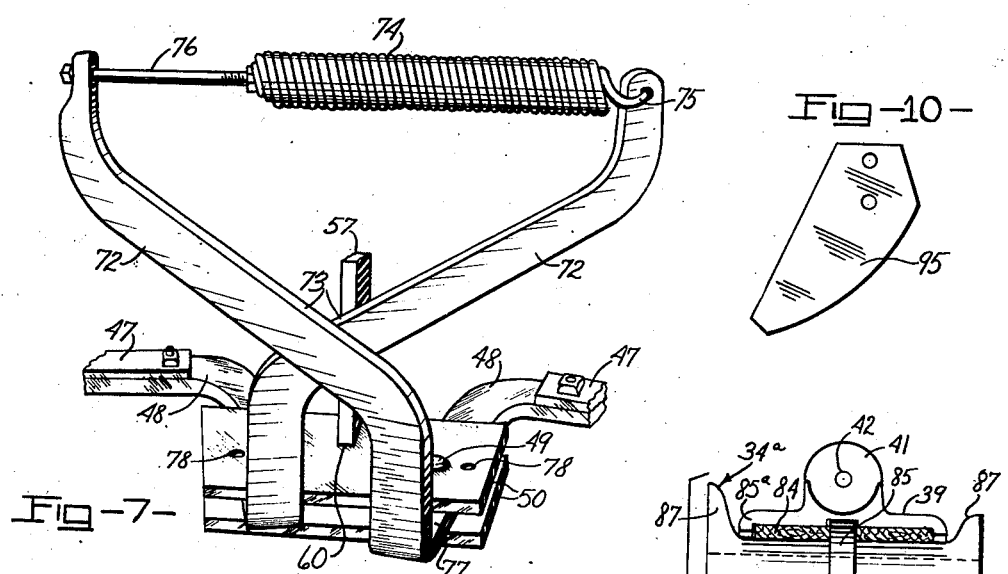
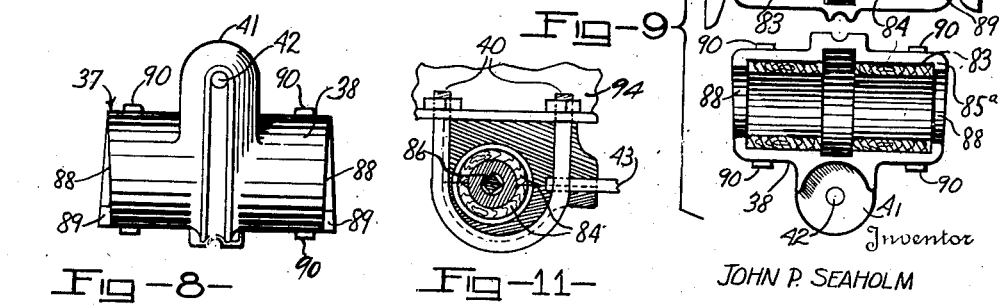

Patented May 25, 1943

2,320,015

UNITED STATES PATENT OFFICE 2,320,015

DISK HARROW

John P. Seaholm, Moline, Ill., assignor to Minneapolis-Moline Power Implement Company, Minneapolis, Minn., a corporation of Delaware Application May 31, 1940, Serial No. 338,076

14 Claims. (Cl. 55—83)

This invention relates generally to improvements in disk harrows and more particularly to that type of harrow generally known as the tandem or double-cut and including two sets of gangs.

The primary object of my invention is to provide a generally improved draft frame and angling mechanism by which front and rear gangs may be individually adjusted as to working or non-working angles, and by virtue of which the harrow as a whole is made far more flexible in its use and operation. Another object is to provide a harrow of this kind including improved means for counteracting the tendency of the gangs to cut unevenly across their entire width. A further object is to provide a novel and extremely effective bearing structure for a disk harrow in which means is embodied to prevent the soil or dirt from working inwardly at the ends of the bearings as now so often occurs. Still another object is to provide an improved scraper construction for the disks whereby the scraper blade itself is not only less expensive to manufacture but is also readily replaceable without replacing any of the scraper mounting mechanism.

These and other more detailed and specific objects will be disclosed in the course of the following specification, reference being had to the accompanying drawings, in which—

Fig. 1 is a plan view of my improved disk harrow showing the front gangs straightened to non-working positions and the rear gangs at a working angle.

Fig. 2 is an enlarged fragmentary section along the line 2—2 in Fig. 1.

Fig. 3 is an enlarged perspective view of a part of one draft beam showing the drag link stop for the forward disk gangs.

Fig. 4 is a view similar to Fig. 1 but showing the harrow in the process of making a turn to the left.

Fig. 5 is a fragmentary perspective view showing a part of the disk gang adjustment and angling mechanism.

Fig. 6 is a side view of the harrow with both disk gangs in straightened or transport positions.

Fig. 7 is an enlarged fragmentary perspective view of a medial portion of the rear gang assembly showing the spring device or snubber for holding the gangs to their work.

Fig. 8 is an enlarged plan view of my improved bearing for the disk gangs.

Fig. 9 is an "exploded" view of the two bearing sections opened to show interior construction and arrangement.

Fig. 10 is an enlarged detail view of the replaceable disk scraper device.

Fig. 11 is an end view of the bearing and associated draft and mounting parts.

Fig. 12 is a fragmentary cross sectional view showing a modified view of draft bar assembly.

Reference will be had herein to my three copending applications Serial No. 270,960, now Patent No. 2,226,586; Serial No. 282,091, now Patent No. 2,226,587, and Serial No. 341,867, filed June 22, 1940, now Patent No. 2,266,819, all relating to disk harrows, which embody various advantageous features of construction and operation of which some use is made in the present harrow structure. Likewise certain features of the present invention will be applicable to my prior harrow structures.

Referring now more particularly and by reference characters to the drawings, it will be seen that my harrow comprises a draft frame structure and assembly A which has connection to the tandem front disk gangs B and C and rear disk gangs D and E. The frame A comprises a central, longitudinally extending main draft member, tongue, or pole 11 having a clevis or connection 12 at its forward end for the attachment thereto to the tractor or other draft device. At the rear end a cross member, or members, 13, is rigidly secured and the inner ends of the laterally extending, outspread draft or side bars 14 (which form parts of the gangs also) are pivotally connected to this member about the vertically axised pivots 15. These draft bars are thus adapted and enabled to swing forwardly and rearwardly in horizontal planes with respect to the tongue 11.

The draft bars 14 are supported and braced at any relative adjusted angles by means of brace members or bars 16 which are pivotally connected at 17 at their rear ends to outer end portions of the draft bars and converge forwardly therefrom to the tongue 11. A connecting or adjustment member or slide 18 is adjustably mounted on the tongue 11 for forward and rearward adjustment thereon and comprises a plate 19 bent downwardly at front and rear ends 20 and apertured through these ends at 21 to slidably receive the tongue. A rearward, lower extension 22 of the frontal end forms vertically spaced side or wing portions between which are extended vertically axised pivot pins 23 which engage and support the forward ends of the brace bars 16.

Adjacent its forward end the top or plate 19 of the member 18 carries a rigidly mounted bracket 24 in which is slidably and vertically supported a latch pin 25 which is normally urged downward by coil spring 26 to penetrate the plate 19 (which is suitably apertured of course), and engages any selected one of a series of longitudinally spaced openings 27 in the upper surface of the tongue 11. It is apparent of course that adjustment of the member 18 along the tongue will, through the connection with the brace bars 16, swing the draft bars 14 forwardly or rearwardly to any selected angular positions. The latch pin 25 carries a transverse stop pin 28 and a lever 29 is pivoted at 30 to the bracket to engage beneath this pin 28 so that the latch pin may be raised to clear the openings 27. A cable or rope 31 may be secured to the upper end of the lever for remote control of the latching mechanism, as for instance from the seat of the tractor pulling the harrow.

The front disk gangs B and C each comprises a series of disks 32 arranged upon a gang bolt or axle 33 and clamped thereon in spaced relation to each other. Spacing spools 34 are employed between the disks and the usual bumpers are provided at the inner ends of the gangs, it being understood of course that the disks of the respective gangs are oppositely faced in usual manner. The spacer spools may, as indicated by the parting lines 36, be made in two complementary sections as a convenience in manufacturing and assembly.

Each disk gang is provided with a pair of bearings designated generally at 37 which rotatably engage special bearing and spacer spools 34a between the proper disks 32 and these bearings will at this point be only described in general as including upper and lower sections 38—39 clamped together by U-bolts 40 and (on the front gangs) having forwardly directed and vertically spaced lugs 41. These lugs 41, vertically apertured at 42 to pass one leg of the U-bolts 40, receive the rear ends of drag links 43 which are pivotally engaged with the U-bolts for horizontal swinging movements. The forward ends of the drag links 43 are pivotally connected on vertically axised pivot connections 44 to the draft bars 14 to thus connect the disk structure to the draft frame.

It will be noted, in Fig. 1, that the forward ends of the drag links 43 are offset inwardly to so dispose the draft lines between the pivots at the ends of the links, that the draft will be transmitted to the gangs at right angles to the axes of rotation thereof. This condition of course only obtains in the forwardly angled working position of the gangs. Reference is invited to my copending applications hereinbefore identified for more complete descriptions of the draft lines and forces and advantageous features of this drag link construction.

In the operation of the harrow as thus far described it will be evident that the gangs B and C may be angled forwardly from the position shown in Fig. 1 to a working angle causing the disks to work the ground in usual manner. Such adjustment of the gangs is made, under control of the latch mechanism, by sliding the member 18 forwardly or rearwardly as required.

It is of course necessary that the inner ends of the gangs B and C must abut each other at any working angle (in order to mutually support each other), and for this purpose the gangs may freely shift in a lateral direction behind the draft members 14 by virtue of the swinging connection of the drag links 43. However such movement must of necessity be limited to the point that the disks will now come in contact with the draft members 14 and to prevent this I provide stop means to limit the movement. In the present embodiment the members 14 are formed of angle irons with rearwardly and downwardly turned flanges 45 (Fig. 3) and these flanges are slotted at 46 to clear the forward ends of the drag links 43. The length (horizontally) of the slots 46 is then proportioned to permit only the required transverse shifting or swinging movement of the links.

Obviously, however, I may employ any of the draft member and drag link stop constructions disclosed in my copending applications in lieu of that herein shown.

The rear gangs D and E include the forwardly arranged and outwardly spread draft bars or members 47 which at inner ends are turned rearwardly at 48 and pivotally connected about vertically axised fasteners 49 between upper and lower center plates 50. The disk gangs per se comprise each a series of disks 51 arranged on a gang bolt 52 and spaced apart by spools 53. Here again each gang has a pair of bearings 54 engaging bearing spools 53a between the proper disks but in this case the bearings while otherwise similar to the aforesaid bearings 37, have no drag link mounting lugs and the rear drag links, represented at 55, are rigidly secured to the bearings in forwardly extending relation by the U-bolts connecting the bearing sections. Forward ends of the drag links 55 are then rigidly secured, by welding or other means, to the draft bars 47 which are again formed of angle iron but with the downwardly turned webs 56 forwardly disposed. In order to compensate for differences in distance between the bearings 54 of each rear gang the inner links 55 may be made transversely adjustable with respect to the bars 47 as indicated at 55a, by bolting the forward ends of the links to the bars.

This rigid mounting of the rear gangs with respect to the draft bars 47 is necessary since the disks of these rear gangs are in this case faced with their concave sides turned inwardly, or oppositely with respect to the disks of the front gangs B and C, and the end thrust of the disks is outward instead of inward.

Connection between front and rear gangs B—C and D—E is made by three connecting or draft beams 57, 58, and 59. The medial or center one, 57, of these beams, extends longitudinally and at its rear end is fastened rigidly at 60 to the center plates 50 while at its forward end it is rounded to form a hook 61 which may be inserted in either of a front and rear series of openings 62—63 formed in a connecter bracket 64. This bracket having upwardly offset portions provided with the openings 62—63, is secured rigidly atop the top plate 19 of the connecting member 18.

The side beams 58 and 59 are pivotally mounted at their rear ends 65 upon vertical axes to the rear draft bars 47 adjacent outer ends thereof and at their forwardly converging frontal ends are pivotally connected to the draft frame A. For this purpose forward, downwardly turned ends of the bars 58—59 are forged round and passed through the draft bars 14 and the cross member 13 to make the necessary connection and also serve as the pivots 15. All three of the beams 57, 58, and 59 are arched in shape (Fig. 6) and have downwardly turned front and rear ends whereby the beam will substantially clear the front disk gangs B and C over which they pass. The beams are held in proper upright positions by their end mountings and it will be noted (Fig. 2) that the outer or side beams 58 and 59 are pivoted at their rounded rear extremities 67 in short tubular bearings 68 welded to the draft bars for this purpose. As a matter of course, however, were the draft beams of tubular stock or made of spaced superimposed bars, as has been disclosed in my copending applications, sufficient vertical bearing length for the beam ends would be possible without the provision of separate bearing means as herein shown.

In operation now as the front gangs B and C are angled as heretofore described between working and non-working positions, the cooperation of center and side draft beams 57, 58, and 59 will cause a corresponding adjustment or angling of the rear gangs D and E in which operation the draft bears 47 of course move forwardly or rearwardly about the pivots 49. The center of the rear gangs, constituted by the plates 50, is moved forward and rearward by the center draft beam and its connection to the member 18 in this operation. However, by adjustment of the forward end of the center draft beam in the openings 62—63 it is possible to compensate for changes made in rear gang angles by front gang adjustments to the point that almost any relative gang angles may be achieved. For example, referring to Fig. 1, the rear gangs D and E might be straightened out from their working angles shown to non-working position simply by placing the front end of the beam 57 in the proper one of the rear set of openings 63. Likewise the individual relative working angles of the gangs may be adjusted by proper positioning of the center beam in these openings, and forward angling of the front gangs may be had whether or not the rear gangs are in working positions. The center beam 57, as shown in Fig. 6, is arched higher than the side beams in order to clear when a turn is made with the harrow.

The harrow is thus seen to be useful in usual manner as a tandem or double-cut machine or, by relative gang angle adjustments, it may be used to fill a dead furrow or to crown a drive way, for example.

As shown in Fig. 4, the novel draft beam connections between front and rear gangs also makes it possible to make a turn on a very short radius and in this operation it is clear that the rear gangs will properly trail the forward gangs by the action of the draft beams.

In the operation of disk harrows of this type there is, as well known to those skilled in the art, a tendency for the forward gangs to rise at the center and the rear gangs to rise at outer ends due to the end thrust on the individual and oppositely acting disks. To overcome this tendency and therefore cause an even cutting operation across the entire width of both front and rear gangs, I provide the spring devices or snubbers now to be described.

The draft bars 14 of the front gangs B and C carry the rigidly mounted upright standards or arms 69 and a retractile coil spring 70 is connected at its ends at 71 to the upper ends of these arms to exert a pull on a transverse line above and rearwardly of the plane of the pivot connections 15 of the draft bars. The connections 15 are made sufficiently loose to permit some flexibility of movement of the draft bars in the vertical plane and the resultant pull of the spring 70 tends to raise outer ends of the bars. This action of course is transmitted to the gangs B and C and has the result of urging inner ends thereof downwardly to resist the upward thrust thereon and causes the disks to evenly penetrate across the entire width. The foregoing structure operations are similar to those disclosed for the same purpose in my copending applications, and attention is invited thereto for other practical mechanisms useful in this harrow as well.

At the rear gangs a different problem is met with in that the outer ends of the rear gangs D and E must be urged downwardly to secure even penetration of inner and outer disks. For this purpose the inner ends of the draft bars 47 are provided with spring mounting arms or members 72 which may as shown be formed as rigid extensions of the inwardly and rearwardly turned ends 48 of the bars. However formed the arms extend rearwardly from between the center plates 50 and are then turned upwardly and crossed as clearly shown at 73 in Fig. 7. A retractile coil spring 74 is then connected at its ends between upper ends of the arms 72, and the pivots 49 being sufficiently loose, the draft bars 47 will be rocked downwardly at their outer ends by the tension of this spring. This action is here also transmitted directly to the gangs and the down thrust counteracts the upthrust at the outer ends of the gangs to accomplish the desired result.

The spring 74 is hooked at one end 75 to one arm 72 while the other end carries an adjustable screw 76 engaging the other arm but permitting ready adjustment of the spring tension. Similar mounting is provided for the forward spring 70.

It will be noted that one arm 72 extends further rearward than the other from the center plates 50 before the upward bend is formed, this rearward extension being indicated at 77. As a result there is sufficient distance between upper ends of the arms to permit complete freedom of movement thereof at any relative angle of the rear gangs.

The plates 50 have additional openings as represented at 78 to receive the fasteners 49 to thus allow the rear gangs to be adjusted at greater or less spacing between inner ends according to the ground surface results desired.

In the operation of the front gangs B and C they leave between their inner ends a narrow unbroken ridge or strip of ground which it may be desirable to break up. For this purpose I may employ a center sweep or shovel mechanism such as that disclosed in my copending application Serial No. 341,867, above noted, and which comprises a beam 79 pivoted on a horizontal axis at its front end 80 by a bracket 81 secured beneath the tongue 11. The rear end of the beam trails between the innermost disks 32 and carries a blade or shovel 82 for working or breaking out the ridge. The beam 79 is controlled and operated exactly as described in detail in my copending application, and when not in use it may be swung forwardly out of the way.

Referring particularly to Figs. 8, 9, and 11, my improved bearing construction will now be detailed. As aforesaid the bearings 37 comprise upper and lower sections or halves 38 and 39 which are held over the bearing spools 34a by U-bolts 40. These bearing sections have the mating grooves 83 in which are placed oil impregnated bushings 84 of wood or other material to bear on the spool 34a. The spools are each split into two sections, as clearly shown, and placed therebetween are the end thrust disk collars 85 engaged at either side by the bushings 84 which are retained against endwise displacement by the flanges 85a of the bearing.

The spools 34a as well as the collars 85 must turn with the disk gangs and for this purpose the round center openings in the parts are provided with lugs or keys 86 to engage the square gang bolts as will be understood.

It is important to prevent dirt from packing between the bearing ends and the adjacent spool flanges 87 and for this purpose I cut the ends of the bearings off angularly so that, when the bearing sections are properly assembled, these ends will have the spiral or angular shape indicated at 88. Abutments or shoulders 89 are thus formed which will plow or scrape off the dirt which may collect between the ends of the bearings and the spool flanges, and after the spool has passed this point on the bearing the space between the parts gradually widens until the abutment is again reached, thus preventing the dirt from being squeezed into the bearings. To insure that the bearings are properly assembled to provide the necessary spiral relation of their ends they are provided with lugs 90 and are also properly labeled or marked.

The bearings 54 are as heretofore noted of the same general construction and differ only in that no lugs are provided for the drag links.

Each individual disk of the gangs B, C, D, and E is provided with a scraper for its concaved side and the scrapers comprise the mounting tangs 91 which are carried by adjustable bars 92 supported in the yokes 93. Said yokes are secured by brackets 94 to the bearings 37 and 54 and the bars 92 are of course made adjustable to move the scrapers toward and away from the disks as may be required. The scrapers per se take the form of flat blades 95 which are removably mounted by rivets or other fasteners 96 on the tangs 91 and may thus be readily replaced when worn. Furthermore, the scrapers thus mounted may be cut from thin sheet steel and thus will require no sharpening.

The yokes 93 on the rear gangs D and E have rearward extension arms 97 at outer ends and short chains 98 may be hooked on these arms to form draft connections for a spike toothed harrow should one be desired. The short chains and draft hitch thus provided causes the harrow to properly trail the disk harrow on a turn and also provides the very desirable upward angle of draft for toothed harrows in order to prevent trash collection thereby, as will be evident.

As shown in Fig. 12, either or both the front and rear gang draft bars 14 and 47 of the harrow may be made of superimposed angle iron bars 100—101 spaced apart at their facing and horizontally turned webs 102 to provide therebetween room for mounting the disk gang drag links, one of which is shown at 103. The rear gang links will of course be welded or bolted between the bars, while the front gang links, shown in this view, will be pivoted at 104, and the necessary limiting stops will be provided by plates 105 riveted or welded to one angle iron bar and provided with notches 106 for the link. The front gang draft bars fit over and under the cross member 13 to receive forward ends of the draft beams 58—59 forming the pivotal connection 15 between the parts.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A tandem disk harrow comprising front and rear pairs of disk gangs pivotally connected at inner ends for angling adjustments, a draft frame connected to the front gangs, means on the draft frame for making angling adjustments of the front gangs, and draft members connecting the front and rear gangs, the said draft members including a centrally disposed member adjustably connected to the draft frame for adjusting the connected inner ends of the rear gangs in forward and rearward directions.

2. A tandem disk harrow comprising a draft frame, front gangs connected at inner ends to the frame for angling adjustments, rear gangs also connected at inner ends for angling adjustments, draft beams connecting the respective front and rear gangs, and a center draft beam adjustable forwardly and rearwardly on the draft frame and at its rear end connected to inner ends of the rear gangs.

3. A tandem disk harrow comprising a draft frame, front gangs pivotally connected at inner ends to the frame and disposed in outspread positions, means for adjusting the outer ends of the front gangs forwardly and rearwardly about said inner end connections, rear gangs pivotally connected at inner ends for angling adjustments in outspread positions about their inner end connections, draft beams connected between the respective front and rear gangs, and a center draft beam secured to the connected inner ends of the rear gangs and adjustable forwardly and rearwardly with respect to the inner ends of the front gangs.

4. A tadem disk harrow comprising a draft frame, front gangs pivotally connected at inner ends to the frame and disposed in outspread positions, an adjusting member movable forwardly and rearwardly on the draft frame and connected to the front gangs for angling the same about their inner end connections, rear gangs pivotally connected at inner ends for angling adjustments in outspread positions, forwardly converging side draft beams pivotally connected between respective front and rear gangs and forming said pivotal connections of the front gangs, and a center draft beam secured to the connected inner ends of the rear gangs and connected to the said adjusting member on the draft frame, the said center draft beam being adjustable forwardly and rearwardly with, and independently of, the said adjusting member.

5. A tandem disk harrow comprising a draft frame, front gangs pivotally connected at inner ends to the frame and disposed in outspread positions, means for adjusting the outer ends of the front gangs forwardly and rearwardly about said inner end connection, rear gangs pivotally connected at inner ends for angling adjustments in outspread positions about their inner end connections, a center draft beam connected between the inner ends of the rear gang and the draft frame and adjustable longitudinally with respect to the latter, and outer draft beams pivotally connected at their ends to the rear gangs and to the draft frame, the said outer draft beams being connected to the said rear gangs outwardly of their connected inner ends and extending in forwardly converging positions.

6. A tandem disk harrow comprising a draft tongue, front disk gangs connected at inner ends to the tongue for forward and rearward angling adjustments at their outwardly spread ends, a connecting member mounted on the tongue for forward and rearward adjustment, brace members connecting the said connecting member to outer portions of the front gangs, rear gangs pivotally connected at inner ends for angling adjustments forwardly and rearwardly at their outwardly spread ends, a draft beam extended longitudinally and secured at its rear end to the connected inner ends of the rear gang, the said connecting member on the tongue having longitudinally spaced openings to receive the forward end of the draft beam to adjust the same in connection with front gang adjustments and also to permit independent forward and rearward adjustment of the inner ends of the rear gangs with respect to the front gangs, and outer draft beams extended between respective front and rear gangs at each side and connected to said gangs on vertical pivot axes.

7. A tandem disk harrow comprising front and rear pairs of disk gangs arranged in tandem and outspread positions, the inner ends of both front and rear gangs being pivotally connected for angling adjustments of the outer ends of the gangs in forward and rearward directions, means for angling the forward gangs, means connecting outer portions of the rear gangs to the inner ends of the front gangs, and means for adjusting the position of the connected inner ends of the rear gang forwardly and rearwardly with respect to the front gangs either independently of, or in cooperation with, forward and rearward adjustment of the gangs themselves.

8. In a disk harrow, a longitudinally extending tongue, outwardly spread draft beams connected at inner ends to a rear portion of the tongue for relative forward and rearward adjustments, disk gangs connected to the draft beams, brace bars connected to the draft beams and extending therefrom in forwardly converging positions toward the tongue, and an adjuster member formed of a plate provided at one end with a depending extension apertured to encircle and slidably receive the tongue, and the said brace bars being pivotally connected at forward ends to said adjuster member for angling the draft beams forwardly and rearwardly in response to corresponding adjustments of the said member on the tongue.

9. A tandem disk harrow comprising front and rear pairs of draft bars arranged in outspread positions and pivotally connected at inner ends for forward and rearward angling adjustments, draft means for both front and rear draft bars, front disk gangs arranged behind the front draft bars and having their individual disks turned with the concaved sides outward, rear disk gangs arranged behind the rear draft bars and having the concaved sides of their disks faced inward, means connecting the front gangs to the draft bars to permit transverse shifting movement of the gangs to maintain their inner ends in contact under influence of end thrust on the gangs, and means rigidly connecting the rear gangs to the draft bars to resist outward end thrust on the gangs.

10. A tandem disk harrow comprising front and rear disk gangs and draft and angling means therefor, yoke members rigidly supported above the rear disk gangs, and hitch means on the said yoke members for the connection of an implement to the rear of the harrow and for exerting forwardly and upwardly angular draft forces on such implement.

11. In a disk harrow the combination of a pair of disk gangs arranged in oppositely and outwardly extended positions and connected together at inner ends for forward and rearward angling adjustments and limited relative up and down movement, arms rigidly extended from inner end portions of the gangs and turned upwardly in transversely crossing relation, and a coil spring stretched between the crossed upper ends of the arms for exerting upward forces on inner ends of the gangs.

12. In a disk harrow the combination of a pair of disk gangs arranged in oppositely and outwardly extended positions and connected together at inner ends for forward and rearward angling adjustments and limited relative up and down movement, arms rigidly extended from inner end portions of the gangs and turned upwardly in transversely crossing relation, and a coil spring stretched between the crossed upper ends of the arms for exerting upward forces on inner ends of the gangs, the said arms being spaced apart in the longitudinal plane at their crossed portions to clear each other in any angled adjustments of the gangs.

13. A tandem disk harrow comprising front and rear pairs of disk gangs, a draft frame, pairs of draft bars disposed forwardly of the respective gangs and connected thereto, the front draft bars being pivoted at their inner ends to the draft frame, draft braces connecting outer points of the draft bars to the draft frame, means for adjusting said braces with respect to the draft frame to angle the forward gangs about the inner pivoted ends of their draft bars, a member pivotally connecting inner ends of the rear draft bars, a longitudinal center beam connected at its rear to the inner ends of the rear draft bars and adjustably connected at its forward end to the draft frame for longitudinal adjustment with respect thereto, and draft braces connecting outer parts of the rear draft bars to the draft frame, said center beam and rear draft braces being arched to give operative clearance to the front disk gangs disposed thereunder.

14. A tandem disk harrow comprising a draft frame, front gangs connected at inner ends to the frame for angling adjustments, rear gangs also connected at inner ends for angling adjustments, draft beams connecting the respective front and rear gangs, and a longitudinally adjustable center draft beam connected at its front end to the draft frame and at its rear end to inner ends of the rear gangs.

JOHN P. SEAHOLM.